United States Patent [19]

Bannister

[11] Patent Number: 4,684,425

[45] Date of Patent: Aug. 4, 1987

[54] METHOD OF MAKING CLOTH COVERED PANELS HAVING EDGING STRIPS

[76] Inventor: Brian C. Bannister, 14 Hawkshead Lane, North Mimms, Hertfordshire, England

[21] Appl. No.: 765,312

[22] Filed: Aug. 13, 1985

[30] Foreign Application Priority Data

Aug. 16, 1984 [GB] United Kingdom ................. 8420858
Feb. 19, 1985 [GB] United Kingdom ................. 8504208

[51] Int. Cl.[4] ............................................ B32B 31/00

[52] U.S. Cl. ...................................... 156/216; 52/239; 156/292; 156/344; 156/475; 156/574; 156/578

[58] Field of Search ............... 156/216, 213, 291, 292, 156/475, 499, 500, 578, 579, 268, 344, 443, 298, 574; 52/239, 288.1; 427/282; 118/249, 504, 508

[56] References Cited

U.S. PATENT DOCUMENTS

| | | | |
|---|---|---|---|
| Re. 24,801 | 3/1960 | Kaminsky | 156/499 |
| 2,579,088 | 12/1951 | Piazze et al. | 156/579 |
| 2,590,339 | 3/1952 | Minkow | 118/249 |
| 2,916,079 | 12/1959 | Schiefer | 156/216 |
| 3,279,971 | 10/1966 | Gardener | 156/499 |
| 3,520,755 | 7/1970 | Scholl et al. | 156/216 |
| 3,752,099 | 8/1973 | Hunter et al. | 156/443 |
| 3,949,827 | 4/1976 | Witherspoon | 52/239 |
| 4,021,973 | 5/1977 | Hegg et al. | 52/239 |
| 4,446,663 | 5/1984 | Stumpf et al. | 52/239 |

FOREIGN PATENT DOCUMENTS 1561785 3/1980 United Kingdom .

*Primary Examiner*—Jerome Massie
*Attorney, Agent, or Firm*—Parmelee, Miller, Welsh & Kratz

[57] ABSTRACT

A panel for use as a temporary room divider or screen is formed by adhesively securing to one face of a first rectangular sheet of rigid material, along each of two opposing edges, one face of a tongue of an edging strip having a body providing an outwardly open channel, and fitting a second similar rectangular sheet over and in register with the first sheet, so that two opposing edges of the second sheet also lie along the edging strips. The tongues of the edging strips are stuck to the sheets, and the sheets stuck to one another, by double sided adhesive tapes of appropriate thicknesses. After the two sheets have been stuck together and to said edging strips, cloth or the like covering material is stuck to the outer face of each sheet and surplus edge portions of the cloth or the like are tucked between the edging strips and the adjacent edges of the sheets of rigid material.

5 Claims, 23 Drawing Figures

Fig. 2.
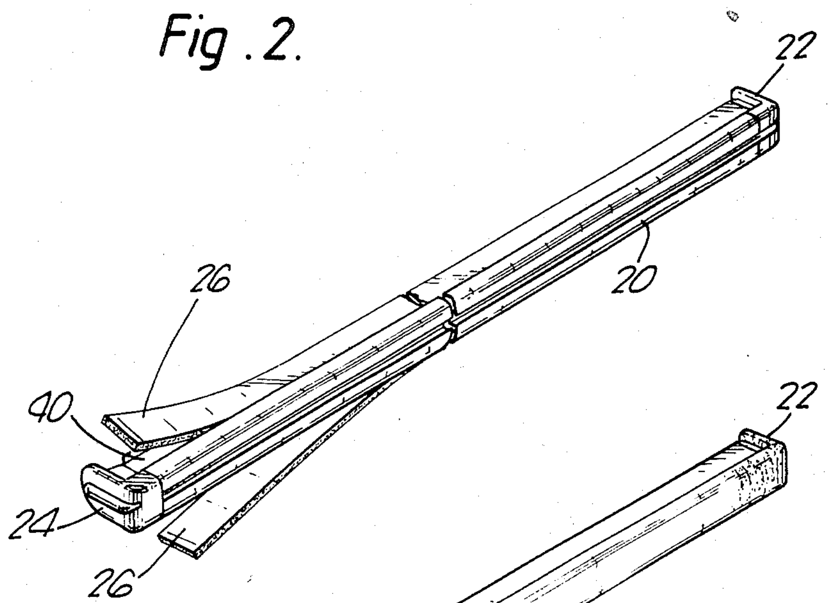
Fig. 3.
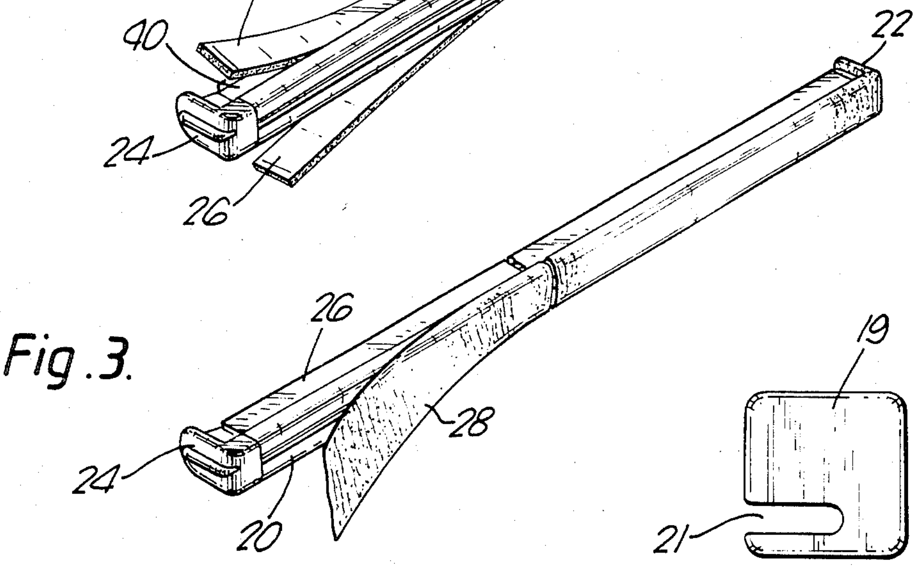
Fig. 4a.
Fig. 5.
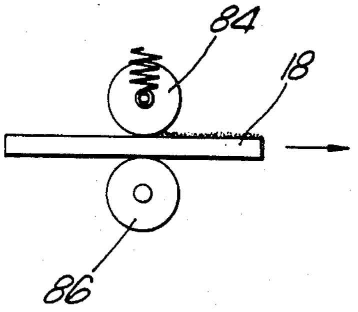
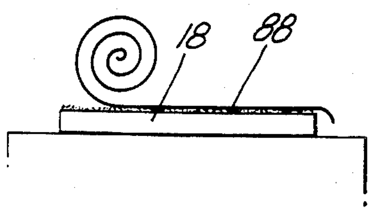
Fig. 6.

Fig. 10a.
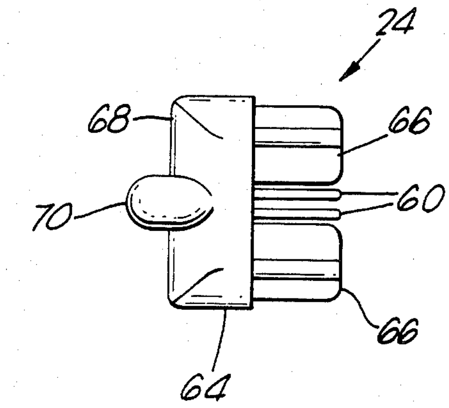
Fig. 10b.
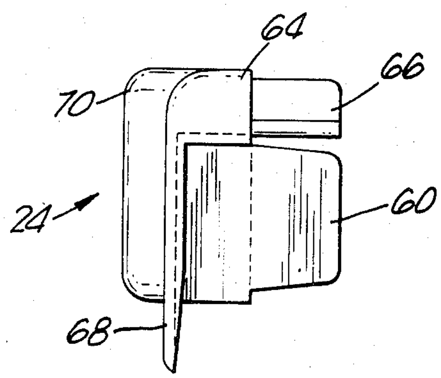
Fig. 10c.
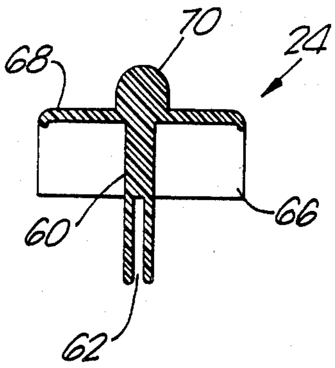
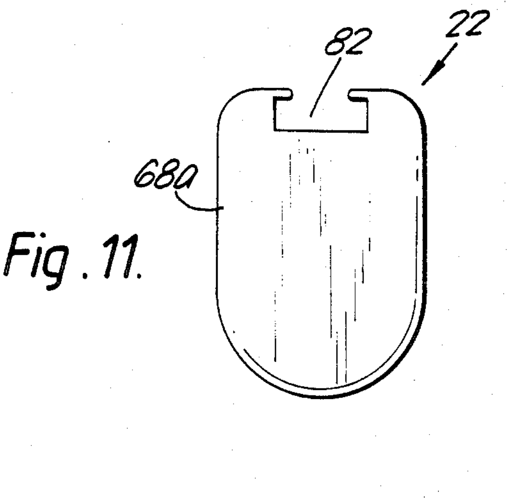
Fig. 11.

Fig. 12.
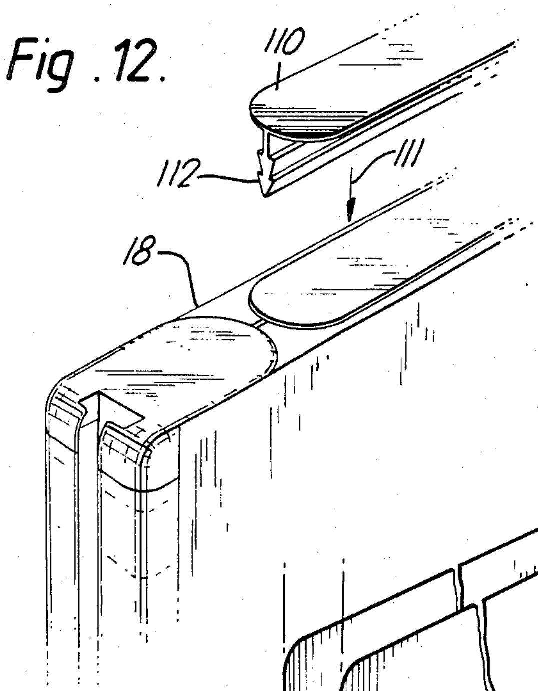
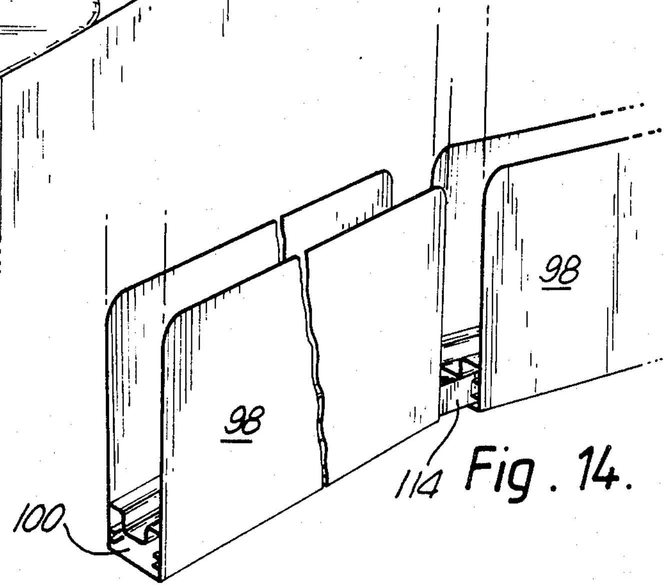
Fig. 14.
Fig. 15.
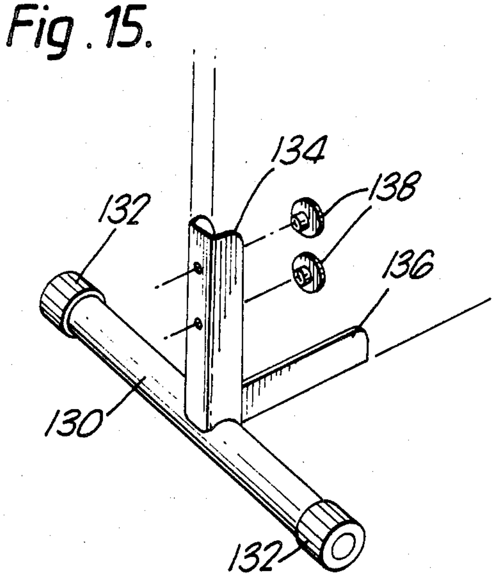
Fig. 16.
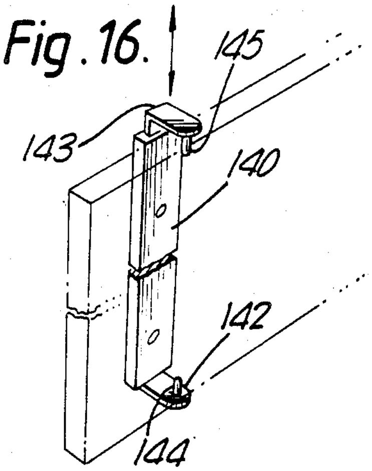

METHOD OF MAKING CLOTH COVERED PANELS HAVING EDGING STRIPS

BACKGROUND OF THE INVENTION

This invention relates to panels such as may be used for creating structures serving as temporary room dividers, screens, exhibition stands, and the like, the panels providing surfaces which may be used, for example, for display purposes.

Our British Patent Specification No. 1,561,785 discloses a panel comprising two sheets of a substantially rigid material and two lengths of edging strip each including a body part which defines a channel extending along the strip, each edging strip further including a tongue extending along the strip and projecting from said body part, on the side of the body part remote from that on which said channel opens, said two sheets of a substantially rigid material being superimposed and having sandwiched therebetween said tongues of said edging strips.

A panel of this kind is hereinafter referred to as being "of the kind specified".

It is an object of the present invention to provide an improved method of making a panel of the kind specified.

SUMMARY OF THE INVENTION

According to the invention there is provided a method of making a panel of the kind specified, comprising adhesively securing to one face of a first one of said two sheets of substantially rigid material, along each of at least two opposing sides of said first sheet, one face of a said tongue of a respective said edgeing strip, fitting the second of said two sheets of substantially rigid material over the first said sheet and in register therewith, so that two opposing sides of the second sheet also lie along said edging strips, with the interposition of adhesive bonding means between said tongue of each said strip and said second sheet and between said first and second sheets, subsequently adhesively bonding to the other face of at least one of said sheets, which forms an outer face of the panel, a piece of sheet covering material.

In a preferred embodiment, the sheet covering material is a flexible material, such as a fabric and said piece of sheet covering material is initially so applied that said piece projects, at its edges, beyond the edges of said sheets of substantially rigid material, and the marginal edges of said piece of flexible sheet material are subsequently tucked into the spaces between the edges, lying along said opposing sides, of said sheet and the body parts of said edging strips.

In the preferred embodiment both outer faces are covered in this manner with flexible sheet material.

Alternatively one or both outer faces of the panel may be covered by pieces of rigid sheet covering material.

The invention also comprises, within its scope, a panel made by the method of the invention.

BRIEF DESCRIPTION OF THE DRAWINGS

Embodiments of the invention are described below by way of example with reference to the accompanying drawings.

In the drawings:

FIGS. 1 to 7 are views illustrating successive stages in the making of a panel of the kind specified by a method embodying the invention, FIG. 10*a* is an end view of a bottom moulding, FIG. 10*b* is a side view of a bottom moulding, FIG. 10*c* is a view in section along the line C—C of FIG. 10*b*, FIG. 11 is a plan view, of a top moulding, FIG. 12 is a perspective view illustrating the use of a top capping member, FIG. 14 is a perspective view illustrating how adjoining panels may be held at a predetermined angle, FIG. 15 is a perspective view illustrating a support arrangement for a panel, FIG. 16 is a diagrammatic perspective view illustrating a wall mounting for a panel.

DESCRIPTION OF THE PREFERRED EMBODIMENT

British Patent Specification No. 1,561,785 discloses a method of making a panel of the kind specified in which each of the two sheets of substantially rigid material, (such as corrugated cardboard material) is first covered with a fabric, the fabric covering being applied to one major surface of each sheet and having its marginal edges extended over the edges of the rigid sheet on to the reverse major surface of the rigid sheet and there adhesively stuck and stapled to the rigid sheet, and subsequently the composite panel is built up by placing on said reverse surface of a first one of the rigid sheets the tongues of two opposing edging strips, stapling these tongues to the reverse surface of the first rigid sheet, applying to the reverse surface of the first rigid sheet bonding strips of double-sided adhesive tape, applying corresponding bonding strips to the exposed faces of the flanges of the two edging strips, fitting respective end stops at the ends of the edging strips and locating these by staples on the reverse face of the first rigid sheet and subsequently the second substantially rigid sheet is fitted in place and the two substantially rigid sheets pressed together to bond them together by means of the adhesive bonding strips. The method disclosed in Specification No. 1,561,785 has, however, the disadvantage of requiring a considerable number of manual operations, albeit requiring no great skill, and it is an object of the present invention to provide an improved method requiring fewer manual operations and resulting in a more rigid product.

Figure 1:
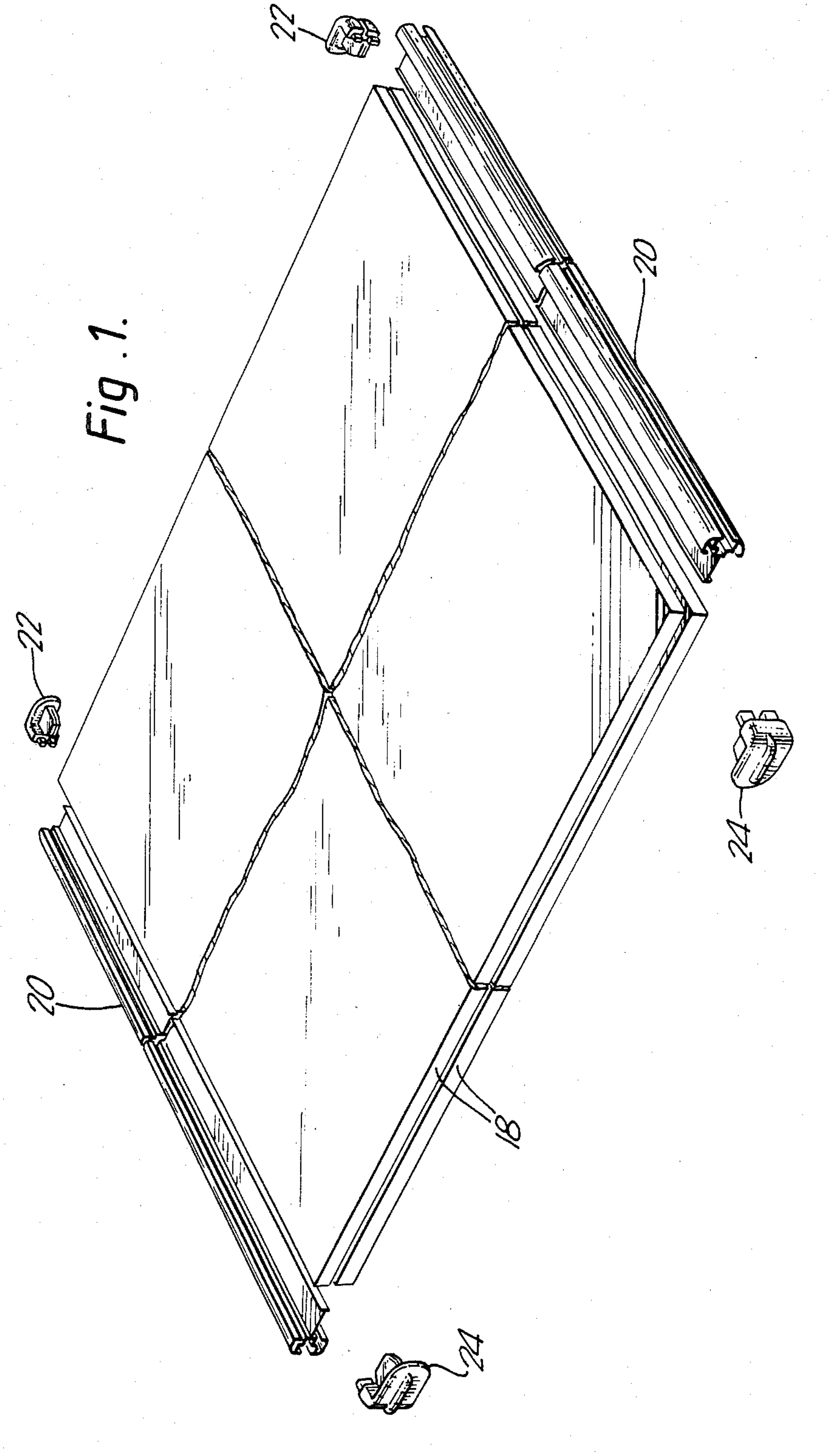
Figure 4:
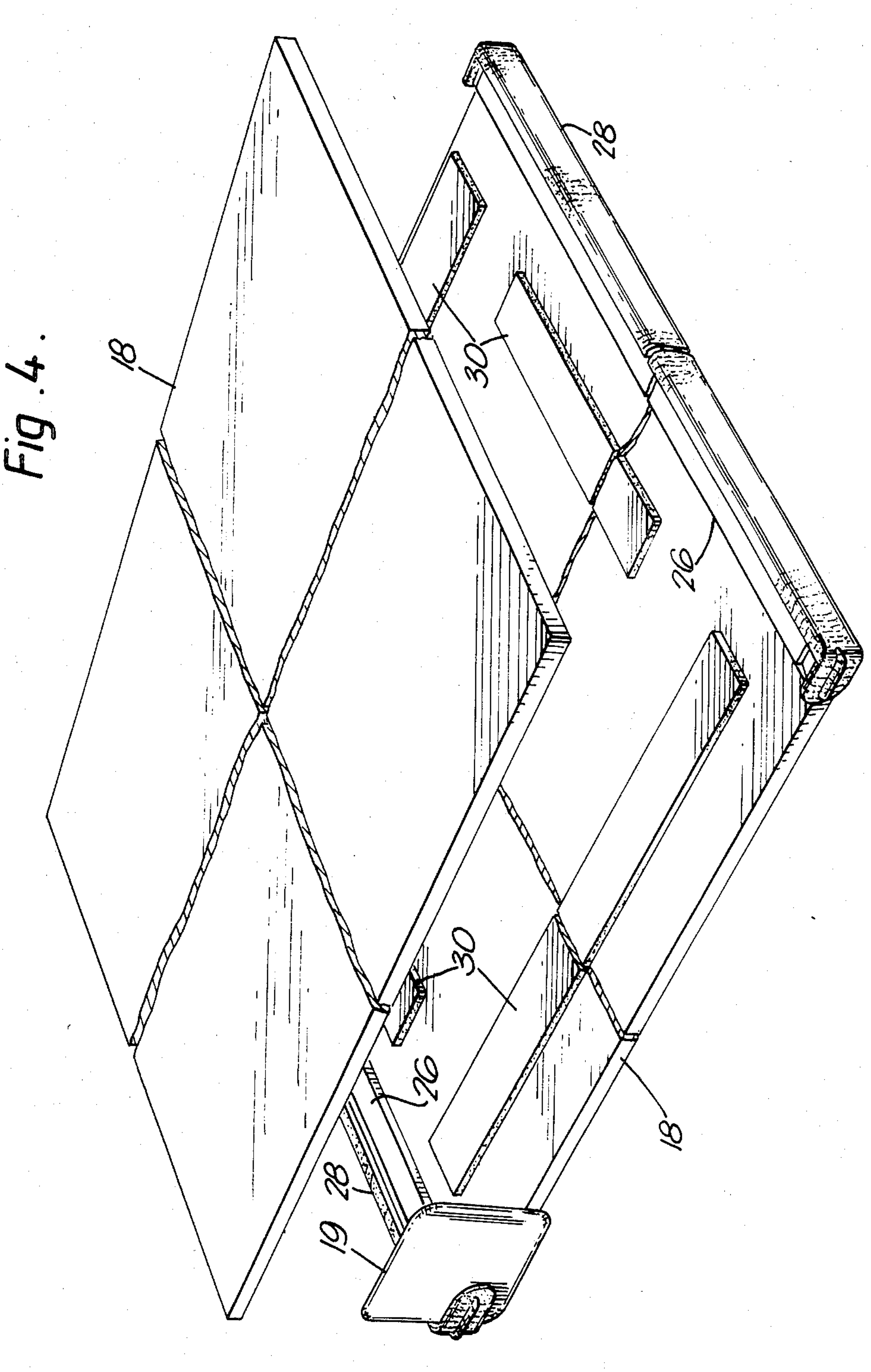

Thus, as shown in FIGS. 1 to 4, in a method embodying the present invention, the two rectangular sheets 18 of substantially rigid material, for example corrugated cardboard material such as that sold under the Registered Trade Mark "DUABOARD" are bonded together with the interposition of the tongues of the edging strips 20 before the covering fabric is applied. Thus, as shown in FIGS. 1 and 2, two sub-assemblies are first formed each comprising a length 20 of edging strip (described in more detail below) and a top and a bottom moulding 22 and 24 respectively (also described in more detail below) at opposite ends of each strip 20. To each face of the tongue 40 of each edging strip 20 is applied a respective strip 26 of double sided adhesive tape. The outer surfaces of each edging strip and of the associated end mouldings 22, 24, i.e. the surfaces of which remain exposed in the completed product, are then covered by a strip of flexible masking tape 28. The two sub-assemblies thus formed are then placed along opposite parallel sides of a first one of the rectangular sheets 18, with the adhesive-strip coated tongues lying over that face of the first sheet 18, which is to be the inner face, with the edges of the sheet 18 engaged with the body parts of the edging strips. Further strips of double sided adhesive tape 30 are applied to the inner face of the lower sheet 18, then the second sheet 18 is then fitted over the first lower sheet, with the marginal opposing edge portions of the upper sheet extending over the tongues of the edging strips 20 and end mouldings, over the areas of the tongues 40 covered by the tape 26, and the upper board 18 is lightly pressed against the lower board 18 to secure the whole together temporarily, (FIG. 4). The double-sided adhesive tapes 28, 30 are preferably of high-density PVC foam, with acrylic adhesive. It will be appreciated that, in place of double-sided adhesive tape some other, dimensioned adhesive system may be used. For example beads of adhesive may be extruded over the respective locations from a suitable tool or gun, with the sheets 18 being placed together before the adhesive has set, to deform the adhesive beads to the appropriate thicknesses. It may be found necessary to use four flat jig plates 19, e.g. of 1 mm thick flexible plastics material, of the form shown in FIG. 4*a*, each having a slot 21 to receive the tongue 60 of the respective top or bottom moulding, such jig plates being interposed between the portion 60 of the respective top or bottom moulding and the adjacent edges of the upper and lower sheets and serving to ensure that sufficient gap is afforded between the portion 68 of the respective moulding and the adjacent edge faces of the sheets 18 for the insertion of a marginal fabric portion during the fabric covering step as explained below.

Figure 8:
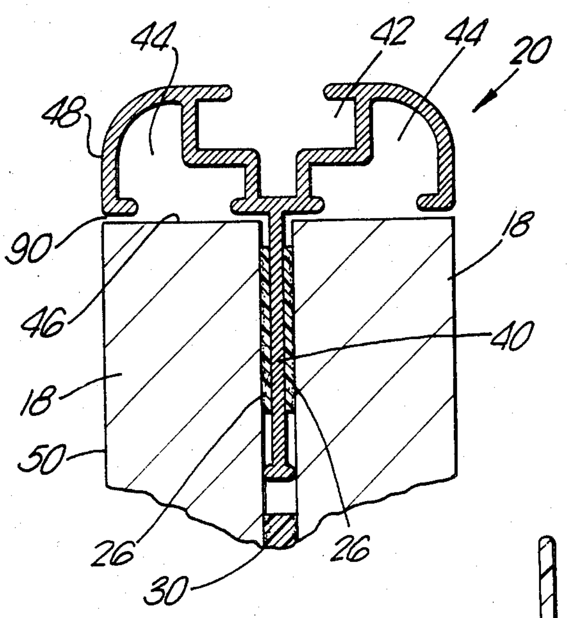
FIG. 8 is a sectional view of an edging strip.

Referring to FIG. 8, each edging strip 20 comprises an aluminium extrusion of generally T-shape, the leg of the T being provided by the tongue 40 of the edging strip. The cross piece of the T defines a central channel 42 which opens in the direction away from that in which the tongue 40 extends and, on either side of the central channel 42, respective edge channels 44 which are open on the same side of the cross piece of the T as that from which the tongue 40 extends. The transverse width of each side of the cross piece of the T is such that when the two panels 18 are secured together with the tongues 40 and strips 26 engaged therebetween, each channel 44 is closed off by the opposing edge face 46 of a respective one of the sheets 18, whilst the respective end face 48 of the cross member of the T lies in substantially the same plane as the outer face 50 of the respective sheet 18. It should be noted that the double sided adhesive strps 26, 30 are plastics strips of substantial thickness which act as spacers between the components which they secure together. The alternative adhesive systems, such as gunned adhesive beads, which may be used, perform the same function. From FIG. 8 it will be noted that the thickness of each strip 30 is substantially equal to the combined thickness of the web 40 and the two strips 26 on either side thereof.

Referring to FIGS. 10*a* to 10*c*, the bottom mouldings 24 each comprise a member of approximately T-section over its major part (see FIG. 10*c*), providing a tongue 60 intended to extend between the superimposed sheets 18, the tongue 60 having, along its free edge, a slot 62 to receive the end of the tongue 40 of the respective strip 20. At one end, the moulding provides, on either side thereof, a respective corner formation 64 intended to fill the space, in the completed panel, between the end of the edging strip 20 and the adjoining end face of the respective sheet 18, and from the region of the two corner formations 64 extend respective pegs 66 of respective cross sectional forms corresponding with that of the channels 44 and intended to extend into the channels 44 from the respective end of the respective edge strip 20. The cross piece of the T-section portion of the member is provided by an end-cap 68, which extends over the end edges of the sheets 18 at the corners of the latter. From the surface of the end plate 68 remote from the tongue 60 extends a substantial rib 70 intended for engagement with the floor surface to protect the lower end of the panel.

Referring to FIG. 11, the top moulding has substantially the same form as the bottom moulding but the rib 70 is omitted and an aperture 82 is formed through the cap 68*a* between the pegs 66, this aperture forming, in the assembled panel, a continuation of the channel 42 and allowing the insertion longitudinally of members such as hinge strips (as disclosed in our Patent Specification No. 1,561,785).

Referring to FIG. 5, the panel, thus assemblied, but without cövering fabric, is now passed through the nip between an upper roller 84 and a lower roller 86, the upper roller 84 being spring biassed towards the lower roller 86 and the upper roller 84 having associated therewith means for applying a liquid adhesive so that as the assembly is passed between the rollers 84, 86, the upper sheet 18 is coated, on its exposed face, with the adhesive. Subsequently, as shown in FIG. 6, the adhesive-coated face of the panel is covered with a fabric, 88, such as a looped knitted fabric, one example of which is brushed-nylon. The fabric covering the panel is then trimmed roughly to shape, leaving generous marginal portions. The panel may then, at this stage, be reversed and passed through the nip between rollers 84, 86 again and the other face of the panel similarly covered with a piece of fabric 88. In a variant of the process described, the adhesive is applied to the fabric which is then, for example, rolled onto the respective faces of the panel. The fabric may be provided with an adhesive coating, for example a pressure or heat-activated coating, during manufacture.

Figure 7:
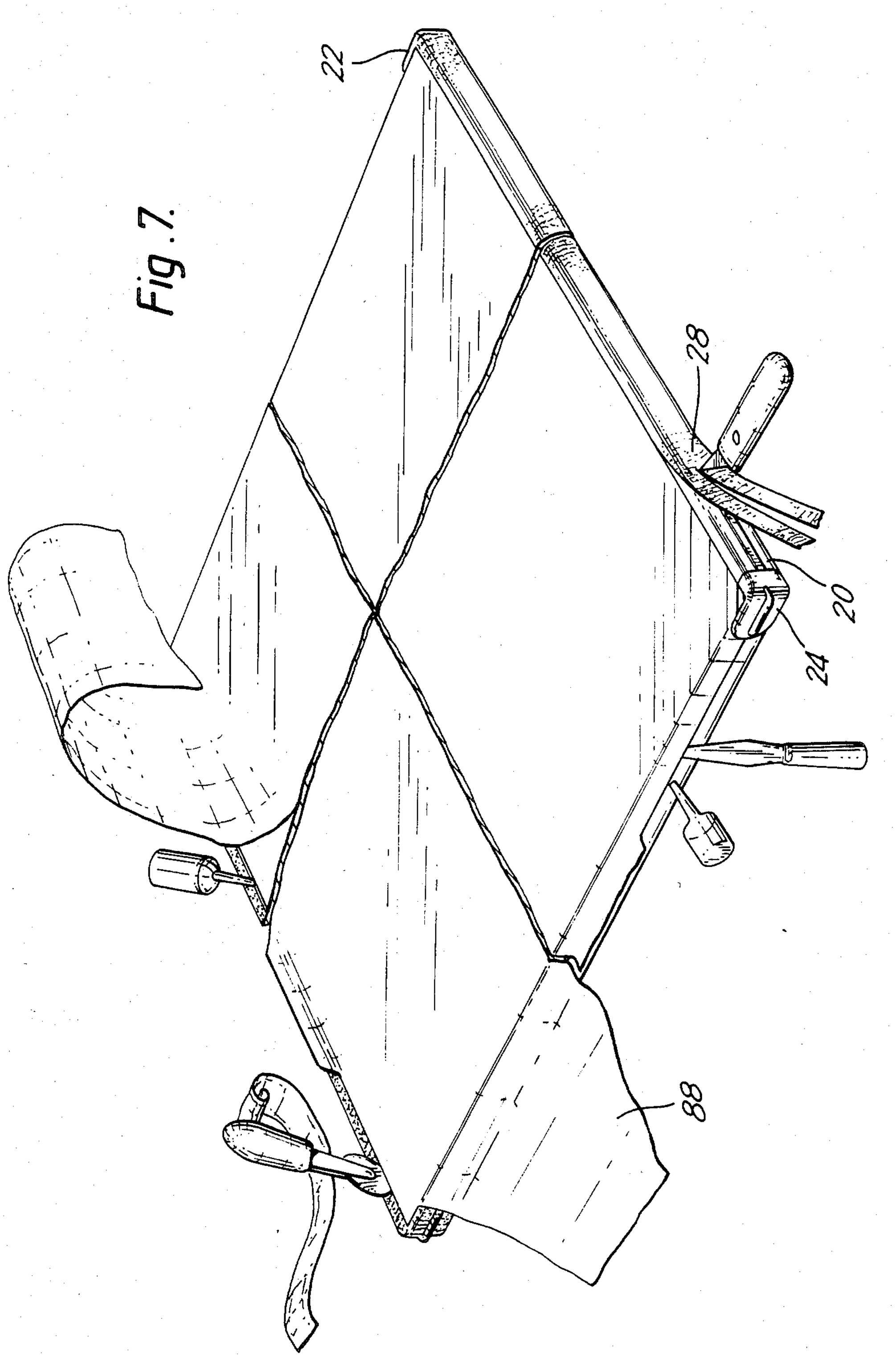

The panel is then finished by hand, as described in the following reference to FIG. 7. At the side of the panel to which the edging strips 20 are fixed, the marginal edge portions of the upper piece of fabric 88 are peeled back to expose the junction between the respective outer face of sheet 18 and the adjoining edge face of the edging strip and a bead of liquid adhesive is injected into the narrow space or slot 90 (see FIG. 8) defined between the respective edge face 46 of the panel and the opposing surface of the edge strip 20. The respective marginal portion of the covering fabric is then trimmed to a width corresponding substantially to that of the edge face 46 of the panel and this marginal portion of the fabric is then tucked into the space or slot 90, to be retained therein by the adhesive previously injected. It will be appreciated that because of the deformable nature of the sheets 18, is not necessary to take measures to ensure that a spacing is left between the edge face 46 and the opposing part of the edging strip over the whole length of the edging strip. As the fabric is relatively thin, very little space is required in any case and, because of the nature of the material of the sheets 18, the edge face 46 is inevitably somewhat irregular so that it actually engages the edging strip 20 at only a few locations and is readily deformed further at these locations when the marginal portion of the fabric is tucked in, for example by means of a thin-bladed tool, which may be in the form of a thin rotatably mounted disc.

Instead of both faces of the panel being covered by fabric as described, one face, or both faces, may be covered by a rigid sheet material, such as plastics or laminate.

Subsequently, at the opposite ends of the panel, the covering fabric is trimmed to provide a somewhat wider marginal overlap, glue is injected into the spaces defined between the opposing sheets 18 and the marginal fabric portion is tucked into the space between the two sheets be retained therein by the glue. The masking tape 29 applied to the edging strips 20 is then removed by slitting the tape along the central channel 42 and peeling off the two portions of tape from the aluminium extrusion. The masking tape 28, of course, serves to protect the surface of the aluminium extrusion from the applied liquid adhesive.

It will be appreciated that it is not necessary to conduct corresponding steps on opposite faces of the panel at a same time or immediately after one another. For example, it is possible, and may be advantageous, to substantially complete the trimming and tucking in of the fabric piece on one side of the panel before adhesive coating and applying fabric to the opposite face of the panel.

It will be understood that at some stage before tucking of the fabric edges in is completed, the fabric is also tucked into the space between the end cap 68 of each end moulding 22, 24 and the opposing end face of the panel 18 and appropriate variations in the width of the fabric margins are allowed in the regions of the corners of the panel, to take account of this. Likewise, right-angled cut outs are formed in the regions of the corners of the panel 18 to avoid difficulties which would otherwise be caused by attempting to insert multiple thicknesses of fabric into the narrow slots between the members.

Figure 9:
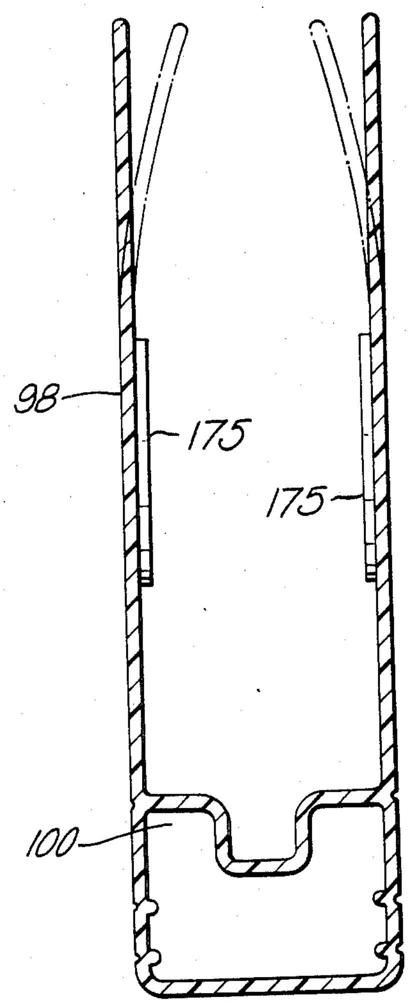
FIG. 9 is a sectional view of a protective end strip.

In order to protect the lower edge of the panel, in use, from damage such as might be caused by kicking by shoes, the lower edge of the panel may be covered by a protective strip 98 of the cross sectional form shown in FIG. 9, which is substantially that of a rectangular channel, open at its upper end to receive the lower edge of the panel and having an enclosed hollow base providing an internal cavity 100. The protective strip is preferably formed by extrusion and preferably is so formed that, in an unstressed state, the sides of the channel curve towards one another towards the open mouth of the channel so that they must be sprung apart somewhat to allow the lower edge of the panel to be inserted in the channel and thereafter grip the panel resiliently. In order to increase the effectiveness of such grip, the inner faces of the sides of the channel may have bonded thereto discs 175 of hooked pile fastener fabric to engage releasably in the fabric covering of the panel.

As shown in FIG. 12, the space between the sheets 18 into which the upper marginal portion of the fabric are tucked may be covered by a top capping member 110 of the cross sectional form evident from FIG. 12, the top capping member being substantially of T-section with the stem 112 of the T being barbed as shown and the cross piece of the T providing a flat plate. The top capping member may also be formed as an extrusion. To secure the top capping, adhesive is injected in the slot between the panels 18 or is applied to the sides of the ribbed web providing the stem of the T and the latter web is driven into the slot between the panels 18 as indicated by the arrow 111. The ribbed web is preferably a friction fit in said slot and, if desired, may be retained in the slot solely by friction, without the adhesive.

Figure 13A:
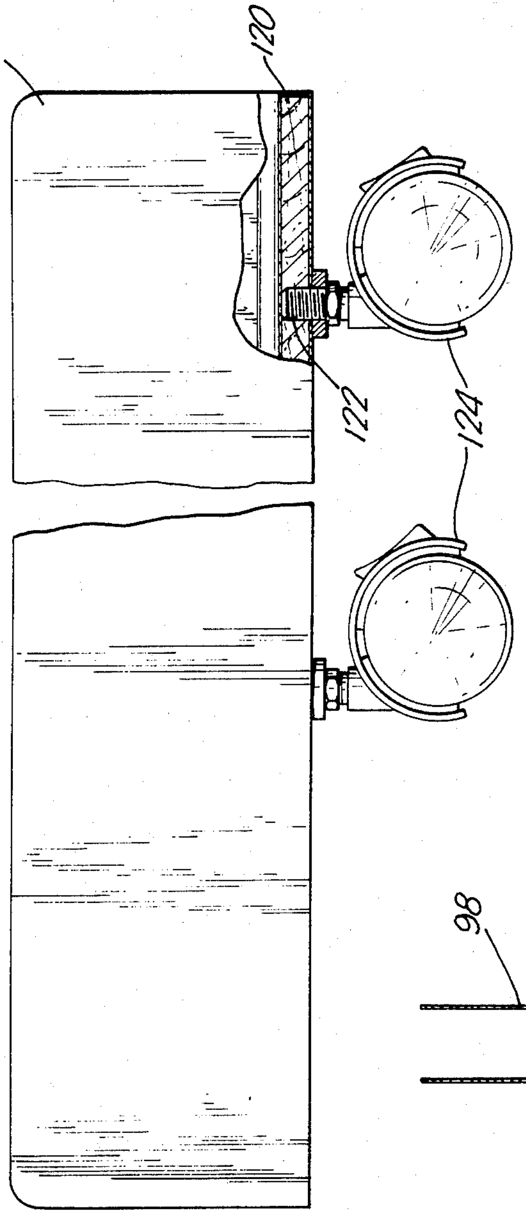
FIGS. 13*a* and 13*b* are respectively a side view, partly in section, and an end view, showing how castors may be fitted to an end of a panel of the kind specified fitted with a protective strip of the kind illustrated in FIG. 9.
Figure 13B:
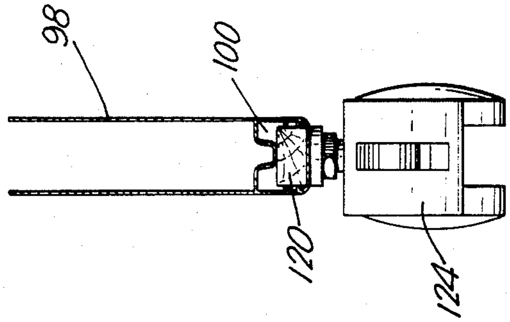

Referring to FIGS. 13A and 13B, a panel may be provided, at its lower end, with castors, utilising the protective strip 98, by inserting, in the ends of the space 100 within the hollow base of the channel, respective blocks 120, for example of wood, and screwing the supporting shanks 122 of the castors 124 into such blocks through the underside of the base of the channel as shown. The castors 124 may be fitted with brakes.

The angle between adjoining panels in an assembly of such panels fitted with protective strips at their lower ends may be fixed, as shown in FIG. 14, by engaging in the hollow bases 100 of the adjoining panels, respective connecting members 114, for example of rigid tube of corresponding cross-section, each member comprising two limbs disposed at a desired angle, for example 180°, 135° or 90° as shown. These connecting members 114 may be provided with apertures, as shown, whereby castors such as indicated at 124 in FIG. 13, can additionally be used. It will be apprciated that similar strips 98, in an inverted position, could be provided at the upper ends of the panels and fitted with corresponding connecting members 114.

FIG. 15 illustrates another means whereby a panel of the kind described may be supported. In this arrangement, a transverse member 130, for example, a length of tube, carries enlarged end fittings 132, (or alternatively wheels), for engagement with the floor surface. From the middle of member 130 extends vertically a channel-section member 134 intended to fit over an edging strip 20 and a similar channel member 136, to receive the adjacent portion of the lower edge of a panel, extends horizontally from the middle of member 130. The fittings shown in FIG. 15 may be secured to the panel (not shown) by means of bolts 138 having enlarged head portions to locate the same in the wider part of the respective channel 42 and narrower shanks to extend freely through the mouth of the respective channel 42, the base of the channel section portion 134 being provided with apertures through which the shanks of the bolts may be passed to be secured by nuts (not shown). In this manner the fitting of FIG. 15 may be releasably secured to the panel.

Referring to FIG. 16, panels of the form described may be advantageously mounted on a wall, with the edging strips 20 extending horizontally and providing the upper and lower edges of the panel, by means of fitments of the kind shown in FIG. 16. Each said fitment comprises an upright 140, secured to the wall surface by screws or the like, and a lug 142 at the lower end of the upright 140 projecting outwardly from the wall and carrying an upwardly extending spigot 144 for engagement with the channel 42 of the lower edging strip of the panel. A similar lug 143 is carried at the upper end of upright 140 and similarly carries a downwardly projecting spigot 145 for engagement in the channel 42 of the upper edging strip. Preferably, however, the upper leg 143 is mounted for vertical movement relative to the upright 140 and is spring loaded towards its lowermost position so that the panel can readily be fitted by pulling the lug 143 upwardly, engaging the lower spigot 144 in the lower edging strip, swinging the panel towards the wall to bring the channel 43 in the upper edging strip below the spigot 145 and allowing the lug 143 to return to its lower position and the spigot 145 to enter the channel 43 in the upper edging strip. A similar fitment provided on the wall spaced transversely from the first so that the panel can be supported adjacent either end thereof in a respective bracket. With this arrangement, it is possible to utilise both sides of a wallmounted panel, so that, for example, the panel can readily be reversed by lifting the lug 143 of one of the brackets, tilting the panel upwardly slightly so as to clear the lower spigot 144 whilst remaining disengaged from the upper spigot 145, swinging the panel ground the axis of the spigots 144 and 145 of the opposite bracket, through 180°, then sliding the panel longitudinally to bring its opposite end within the area of the first mentioned bracket and relocating the panel in the first mentioned bracket.

In embodiments in which the panel is intended to be mounted on a wall with one face of the panel facing permanently outwardly from the wall, the fabric covering on the other outer face may be omitted.

Figure 17A:
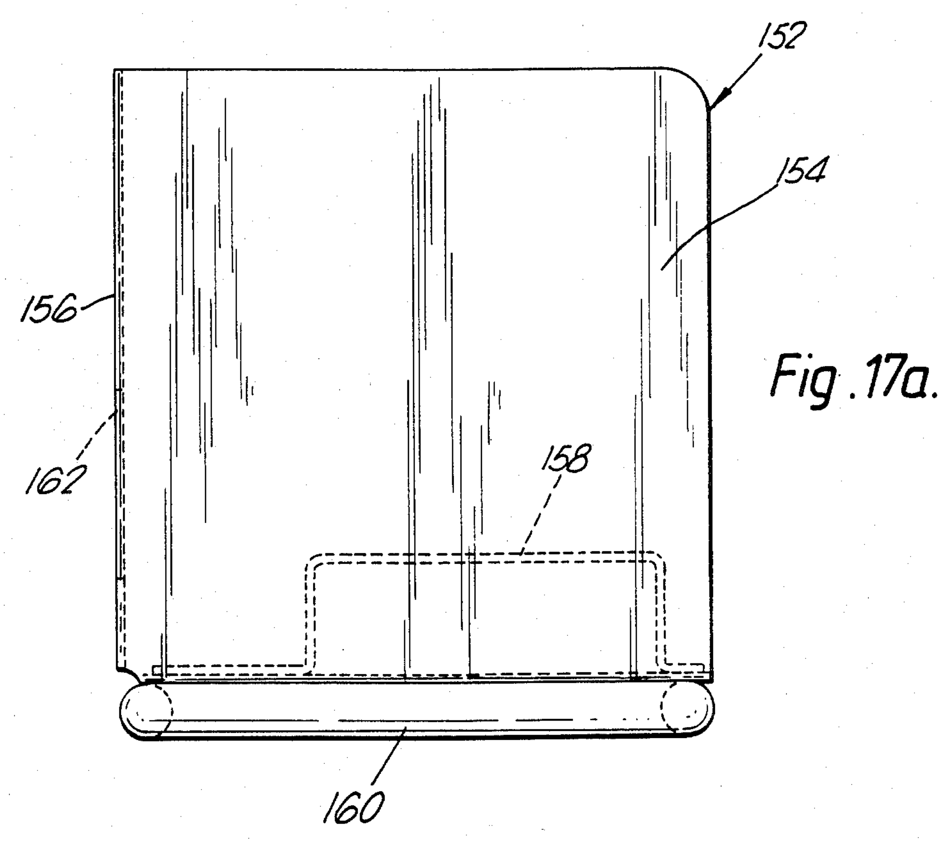
FIGS. 17*a* and 17*b* illustrate an alternative to the support arrangement of FIG. 15, and, FIG. 18 is an enlarged end view of the plastic hinge strip for connecting adjacent panels.
Figure 17B:
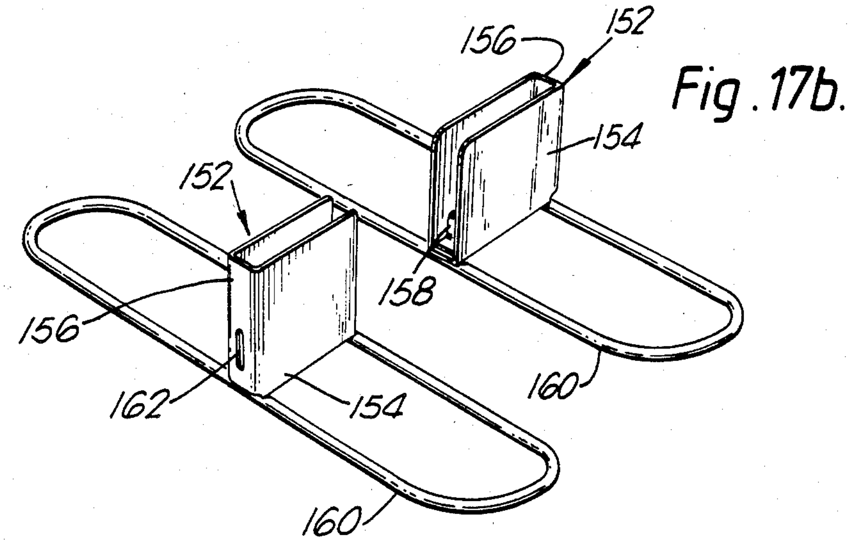

FIGS. 17*a* and 17*b* illustrate an alternative form of fitting, referenced 152, performing the function of the fittings of FIG. 15.

The fitting 152 comprises a sheet metal part, forming a pocket, open at the top and at one end, to receive a respective lower corner of the panel, with side walls 154 engaging the major side faces of the panel, an end wall 156 engaging the respective vertical edge of the panel, and a bottom part, engaging the lower edge of the panel. As shown in FIG. 17*a*, the bottom part incorporates, within the pocket, a metal strip providing a portion 158 raised with respect to the remainder of the bottom part. The fitting includes an open base 160 formed of metal rod, and to which the bottom of the sheet metal part of the fitting is secured by welding. The space within the pocket between the end wall 156 and the beginning of the raised portion 158 is such as to accommodate, as a free fit, the rib 70 of the bottom moulding 24 at the respective end of the panel. A slot 162 in the end wall 156 is provided to receive bolts such as illustrated at 138 in FIG. 15 having enlarged head portions locating in the wider part of the respective channel 42.

Figure 18:
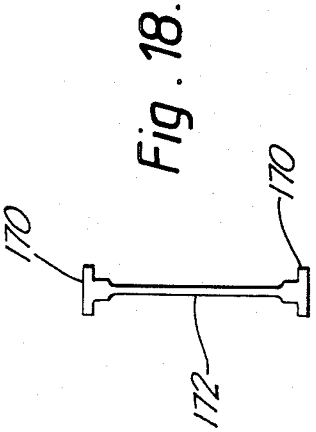

Adjacent panels of the form described with reference to the drawings may be hingedly connected by means of a plastics hinge strip in the form of an extrusion of the cross-sectional form shown in FIG. 18 having enlarged edge portions 170, each adapted to engage as a snug sliding fit in the channel 42 of the edging strip 20 at the respective edge of a respective one of the two adjacent panels, the portions 170 being connected by a thin flexible web 172 which extends through the mouths of the adjoining channels 42 of the adjacent channels and provides a flexible connection between the channels.

I claim:

1. A method of making a panel comprising two sheets of a substantially rigid material and two lengths of edging strip each including a body part which defines a channel extending along the strip, each edging strip further including a tongue extending along the strip and projecting from said body part, on the side of the body part remote from that on which said channel opens, said two sheets of a substantially rigid material being superimposed and having sandwiched therebetween said tongues of said edging strips the method comprising adhesively securing to one face of a first one of said two sheets of substantially rigid material, along each of at least two opposing sides of said first sheet, one face of a said tongue of a respective said edging strip, fitting the second of said two sheets of substantially rigid material over the first said sheet and in register therewith, so that two opposing sides of the second sheet also lie along said edging strips, spacing the base of the channel of each edging strip from the adjacent edges of at least one of said sheets a small distance to form a slot therebetween, subsequently adhesively bonding to the other face of said at least one of said sheets, which forms an outer face of the panel, a piece of flexible sheet covering material, which is initially so applied that said piece projects, at its edges beyond the edges of said sheets of substantially rigid material, each marginal edge portion being then fixed in place by a process which includes the steps of injecting a liquid adhesive into the slots between the base of the channel of each edging strip and the adjacent edge of said at least one of said rigid sheets, and subsequent tucking into the adhesive-occupied slots, by means of a thin-bladed tool, the respective marginal edge of said piece of flexible sheet material.

2. A method according to claim 1 wherein each said piece of flexible sheet material is initially made substantially larger than a said rigid sheet and, after the piece of flexible sheet material has been adhesively bonded to the rigid sheet, the piece of flexible sheet material is trimmed to leave said marginal portions extending beyond the edges of the rigid sheet, and which marginal portions are subsequently tucked into said slots.

3. A method according to claim 1 wherein at least one of said other two edges of the panel has applied thereto. after tucking in of the respective marginal edge portion of covering material, a capping member of generally T-shaped cross section having a tongue which is inserted into the respective said space and a flat top which overlies the respective edge faces of the rigid sheets.

4. A method according to claim 1 including the steps of covering the surfaces of each said edging strip which will be exposed outwardly in the finished panel with masking tape prior to said adhesively securing step and subsequently removing said masking tape after said tucking step.

5. A method according to claim 4 wherein said adhesive is applied to the outer face of each said rigid sheet by passing the assembly under an adhesive-applying roller which also serves to press the two rigid sheets together.

* * * * *